United States Patent
Scott et al.

[11] Patent Number: 5,437,219
[45] Date of Patent: Aug. 1, 1995

[54] LOW STRESS CONICAL TYPE DIAPHRAGM

[75] Inventors: Daniel G. Scott, Pittsburgh; William K. Mong, North Huntingdon; Willard P. Spalding, Pittsburgh, all of Pa.

[73] Assignee: Westinghouse Air Brake Company, Wilmerding, Pa.

[21] Appl. No.: 145,112

[22] Filed: Nov. 3, 1993

[51] Int. Cl.⁶ ............................ F01B 19/00; F16J 3/00
[52] U.S. Cl. ............................... 92/96; 92/98 R; 92/100
[58] Field of Search ................ 92/93, 96, 98 R, 99, 92/100, 103 F

[56] References Cited

U.S. PATENT DOCUMENTS

| | | | |
|---|---|---|---|
| 1,489,349 | 4/1924 | Hampton | 92/99 |
| 5,220,863 | 6/1993 | Scott et al. | 92/98 R X |
| 5,349,896 | 9/1994 | Delaney, III et al. | 92/98 R |

FOREIGN PATENT DOCUMENTS

| | | | |
|---|---|---|---|
| 3522711 | 1/1986 | Germany | 92/103 F |
| 1-83869 | 3/1989 | Japan | 92/99 |
| 1-83870 | 3/1989 | Japan | 92/99 |
| 2243415 | 10/1991 | United Kingdom | 92/99 |

*Primary Examiner*—John E. Ryznic
*Attorney, Agent, or Firm*—Gary J. Falce

[57] ABSTRACT

A multi-thickness diaphragm member including clamping sections that are sized for assembly of the diaphragm in standard air brake valve devices and a flexure portion intermediate the clamping sections that forms a convolution during assembly. The thickness of the flexure portion is less than that of the clamping sections to facilitate formation of the diaphragm convolution without wrinkling, in order to alleviate progressive fatigue failure. The thin flexure portion of the diaphragm is joined with the respective clamping sections through a tapered area, which lies entirely outside of the annular space in which the diaphragm convolution forms during assembly, to thereby maximize the radius of curvature of the convolution for optimum utilization of the flexure portion in forming the convolution.

30 Claims, 4 Drawing Sheets

FIG. 4
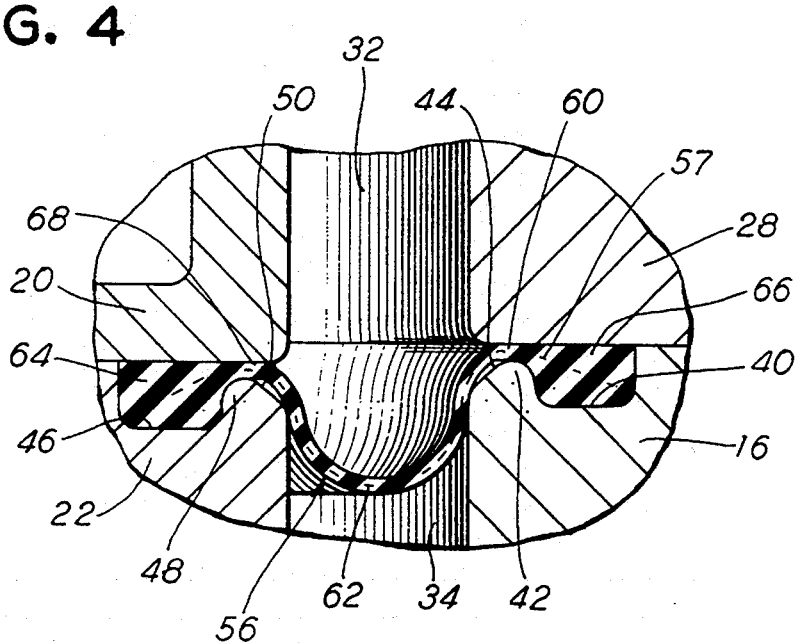
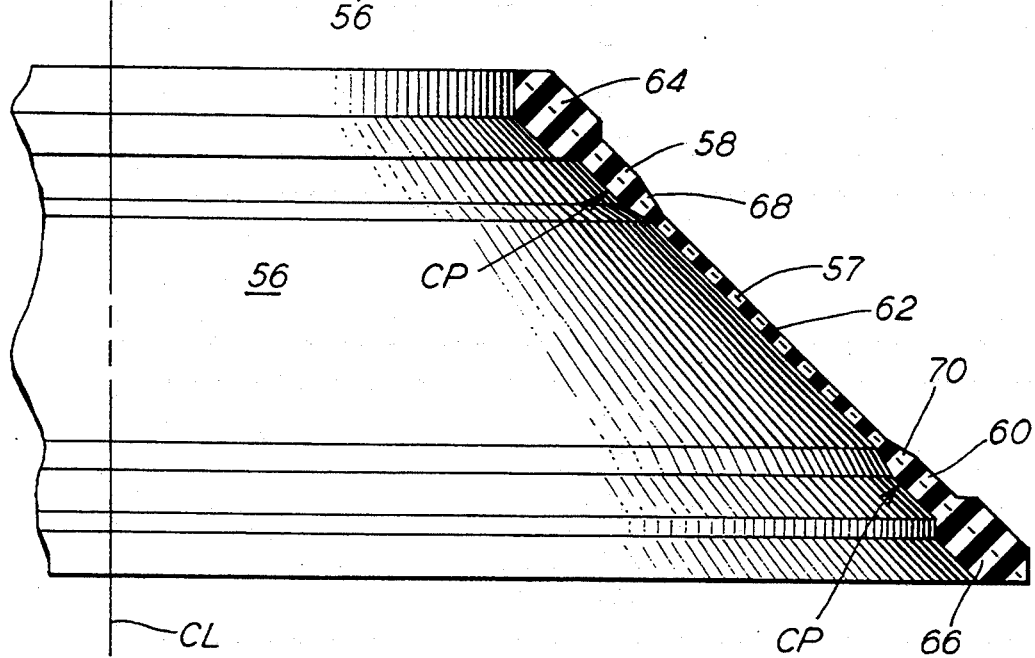
FIG. 3

LOW STRESS CONICAL TYPE DIAPHRAGM

BACKGROUND OF THE INVENTION

The present invention relates generally to fabric reinforced elastomeric diaphragms employed for piston operation in railway type air brake valve devices and, in particular, to thin section elastomeric diaphragms.

In such railway type air brake valve devices, as ABD, ABDW, and ABDX control valves, diaphragm mounted pistons are subject to operation with pneumatic pressures as high as 110 psi. Accordingly, particular emphasis has been placed on designing a clamping arrangement for such diaphragms that will hold the diaphragm against pull-out forces, and at the same time maintain a pressure seal at the diaphragm clamping point.

While such diaphragm clamping arrangements have proven successful over time, the service life of the diaphragm itself has been limited by the tendency of the diaphragm to develop cracks and eventually fail. Such cracking has been found to occur in the convolution area of the diaphragm and particularly on conical type diaphragms that are molded without a convolution. Whereas these diaphragms form a convolution during assembly, such convolution being necessitated by the long travel requirement of the aforementioned control valve pistons, in order for the convolution to form, the outside surface tends to become stretched and the inside surface tends to be compressed. This causes the diaphragm to "bunch up" and thereby produce wrinkles along the inside hoop area of the convolution. It is along the lines of these wrinkles that the diaphragm is predisposed to cracking and eventual failure. It will be appreciated that the thicker the diaphragm for a given radius of curvature of the convolution, the greater the "bunching" tendency and consequently the resultant development of cracks.

SUMMARY OF THE INVENTION

The object of the present invention, therefore, is to optimize the convolution flexure of a diaphragm member without requiring any change in the diaphragm clamping arrangement of standard air brake valve devices in which the diaphragm member is employed.

This objective is accomplished, in an elastomeric diaphragm member having a convolution that is formed by a flexure portion that lies intermediate inner and outer diaphragm clamping portions, by reducing the cross-sectional dimension of the flexure portion relative to that of the diaphragm clamping portions. In providing a relatively thin diaphragm area only within the flexure portion of the diaphragm, compressive stresses that cause wrinkling in the elastomeric material formed by the flexure portion are relieved, thereby alleviating diaphragm failure due to cracks eventually forming in the diaphragm convolution. This is accomplished without requiring any change in the size and/or shape of the diaphragm clamping portions and the clamping arrangements of conventional air brake valve devices with which these diaphragms are employed.

In that the thickness of the clamping portions of diaphragms according to the present invention corresponds to existing dimensions of air brake valve clamping sections, no cost to modify these valve devices is required, as would be the case if the thickness of the diaphragm clamping section were changed. Moreover, the dimensional variation due to buildup of manufacturing tolerances is less critical where the dimension of the clamping section is thicker as compared to being thinner, thus assuring that the diaphragm according to the present invention consistently provides a positive pressure seal, while achieving high retention against pull-out forces.

BRIEF DESCRIPTION OF THE DRAWINGS

Other objects and advantages of the present invention will become apparent from the following more detailed explanation when taken in conjunction with the accompanying drawings in which:

FIG. 3 is a partial section view in elevation showing an improved conical type diaphragm member adapted to replace the diaphragm member of FIGS. 1 and 2 without requiring any modification of the diaphragm piston assembly;

FIG. 4 is an enlarged partial section view in elevation showing a diaphragm piston similar to the assembly of FIG. 1 having the improved diaphragm member of FIG. 3 assembled therewith;

DESCRIPTION AND OPERATION

Figure 1:
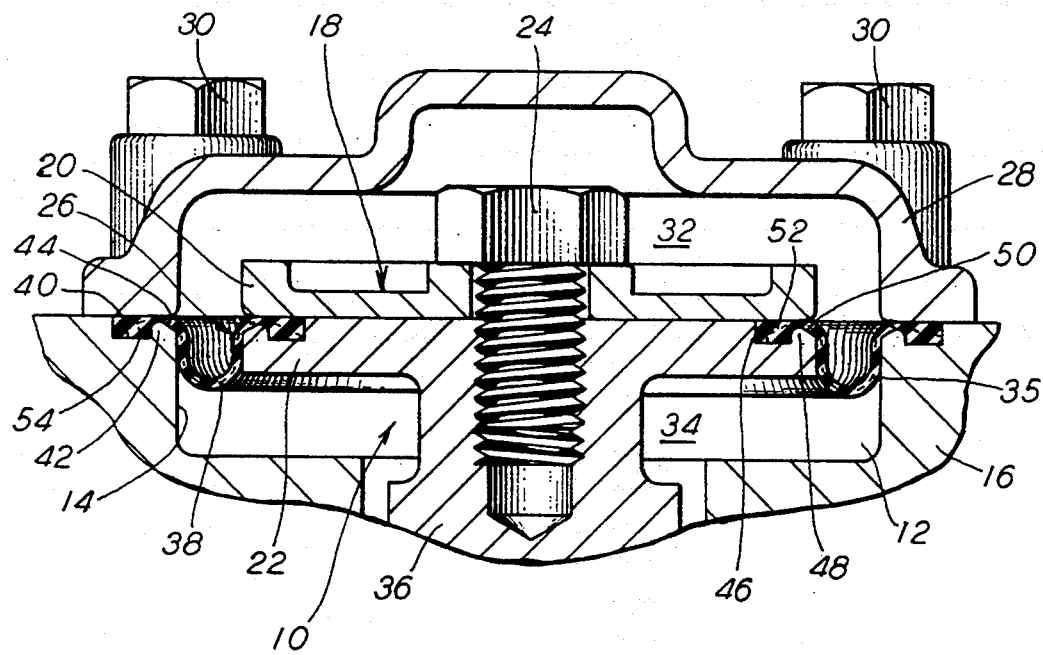
FIG. 1 is a sectional assembly view of a diaphragm type prior art piston assembly, such as is commonly employed in railroad air brake valve devices.

Referring now to FIG. 1, there is shown a conventional diaphragm type piston assembly 10, as employed in the standard, A.A.R. approved, railroad freight brake control valve devices. Disposed in a cavity 12 formed by a wall 14 in the control valve body 16 is a piston member 18 of piston assembly 10, piston member 18 comprising a pair of clamping plates 20, 22 and a cap nut 24 to hold the clamping plates together. Piston assembly 10 further includes an annular diaphragm member 26, the inner periphery of which is clamped between piston clamping plates 20, 22 and the outer periphery of which is clamped between body 16 and a cover 28 that is secured to body 16 by cap screws 30. Diaphragm member 26 traverses an annular space between piston member 18 and body 16 so as to form in cooperation with cover 28, a pressure chamber 32 on one side of piston assembly 10, and in cooperation with body 16, a pressure chamber 34 on the opposite side of piston assembly 10. Diaphragm member 26 includes a centrally disposed layer of reinforcing fabric 35 to prevent diaphragm stretching in the face of high pressure differentials between chambers 32 and 34 to which piston member 18 is subjected.

Valve means, such as a service or emergency slide valve (not shown) is connected by a stem 36 to piston clamping plate 22. Differential pressure force developed between chambers 32, 34 is effective to actuate the piston assembly and its associated valving in an axial direction, such axial movement being accommodated by an annular convolution 38 of diaphragm member 26. This convolution 38 is absent in the as-molded condition of diaphragm member 26, as will be hereinafter discussed, and subsequently formed in the annular space between piston member 18 and body 16 upon assembly therewith and upon piston member 18 being in a neutral position, as shown, between opposite extreme positions.

Body 16 is formed with an annular clamping groove 40, one side of which terminates in an annular clamping bead 42 that is set back from wall 14 and is connected therewith by an inclined surface 44. Similarly, clamping plate 22 is formed with an annular clamping groove 46, one side of which terminates in an annular clamping bead 48 that is set back from the sidewall of clamping plate 22 and is connected therewith via an inclined surface 50.

Figure 2:
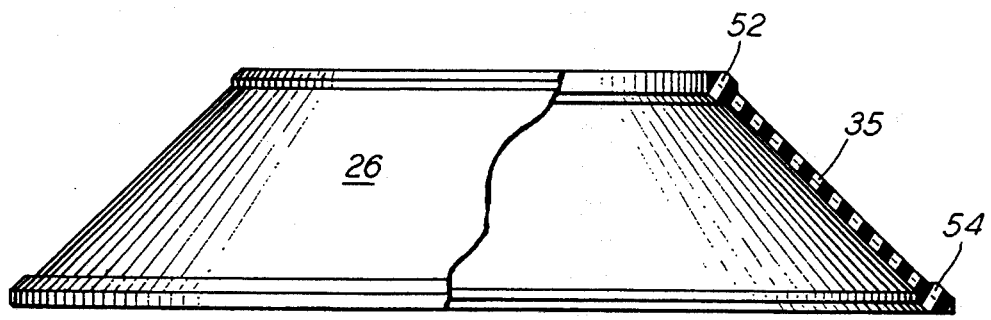
FIG. 2 is an elevation view partially in outline and partially in section showing a conical type prior art diaphragm member commonly employed in diaphragm piston assemblies, such as in FIG. 1.

Diaphragm member 26 is a standard, well-known, conical type diaphragm as shown in FIG. 2, it being well recognized that such diaphragms are molded without a convolution 38, and which convolution subsequently forms in the course of assembling the diaphragm. Except for bulbous end 52 at the inner diaphragm periphery and bulbous end 54 at the outer diaphragm periphery, this diaphragm 26 exhibits a constant thickness throughout of between 0.052 and 0.072 in. The nominal thickness of bulbous ends 52, 54 is 0.10 in.

In assembling diaphragm member 26 with piston member 18, bulbous portion 52 is located in clamping groove 46, afterwhich clamping plate 20 is tightened down on clamping plate 22 by cap screw 24 to retain the inner periphery of diaphragm member 26 in place. Next, bulbous portion 54 is located in clamping groove 40, afterwhich cover 28 is tightened down by screws 30 to clamp the outer periphery of diaphragm member 26 in place. In order to provide sufficient diaphragm length to allow piston travel between its extreme positions, it will be understood that in an intermediate position, excess diaphragm material will exist, this excess material producing the aforementioned annular fold or convolution 38 in the annular space between piston member 18 and body 16. As previously explained, this convolution may be a source of cracks and premature diaphragm failure due to wrinkles that occur as a result of the formation of the convolution. It is known that a narrow space exists between the apex of clamping bead 48 and the confronting face of clamping plate 20, and also between the apex of clamping bead 42 and the confronting surface of cover 28. In that this space is less than the thickness of diaphragm member 26, a pressure seal is realized between the respective clamping beads and diaphragm member. Moreover, this narrow space prevents the bulbous ends at the diaphragm inner and outer peripheries from pulling out of their respective clamping grooves. This provides a time-proven diaphragm clamping arrangement that provides a high pressure seal, while at the same time assuring diaphragm retention against pull-out forces experienced in the course of normal operation under such high pneumatic pressures as are typically employed in the aforementioned ABD, ABDW and ABDX type railroad brake control valves.

In accordance with one embodiment of the present invention, a novel diaphragm member 56 is provided for assembly with piston member 18, as shown in FIG. 4. This new diaphragm member 56 includes a layer of reinforcing fabric 57 that is disposed centrally between the inner and outer diaphragm surfaces and, as shown in FIG. 3, is molded in a conical shape without a convolution to better maintain the reinforcing fabric centrally disposed during molding of the diaphragm member. Formed intermediate an inner annular clamping section 58 and an outer annular clamping section 60 is a relatively thin flexure portion 62, the respective clamping sections and flexure portion lying in a straight line that is inclined relative to a central axis CL. These clamping sections 58 and 60 correspond generally in size and shape to the corresponding clamping areas of conical diaphragm member 26 of FIG. 1, terminating in a bulbous end 64 defining the inner diaphragm periphery and a bulbous end 66 defining the outer diaphragm periphery. The bulbous ends 64, 66 may also conform generally in size and shape to the corresponding bulbous ends of a standard diaphragm member 26. Each clamping section 58, 60 extends from its associated bulbous end 64,66 inwardly beyond a clamping point CP at which the apex of clamping beads 42, 48 engage the diaphragm member in its assembled condition. The thickness of flexure portion 62 is less than the thickness of the standard sized clamping sections 58 and 60, which are preferably joined with the flexure portion 62 by tapered areas 68 and 70. These tapered areas 68 and 70 each are uniformly configured to obtain a smooth transition between the clamping sections and the thinner flexure portion on both the top and bottom diaphragm surfaces, as shown in FIG. 3. The thickness of standard clamping sections 58, 60 may be between 0.052 and 0.072 in., and the nominal thickness of bulbous ends 64,66 is preferably 0.10 in., while the thickness of flexure portion 62 may be between 0.022 and 0.042 in. The length of flexure portion 62 is such as to form a full convolution when diaphragm 56 is assembled in valve body 16, as shown in FIG. 4. In that flexure portion 62 of diaphragm member 56 is relatively thin, as compared to the thickness of standard diaphragm member 26, it will be appreciated that less stress and accordingly less wrinkling occurs at the diaphragm convolution following diaphragm assembly than that which occurs at the thicker convolution 38 formed in standard diaphragm 26. This is due to the fact that the thinner the diaphragm, the less distortion between the inner and outer diaphragm surfaces when the diaphragm is forced to assume a configuration other than its as-molded configuration. Consequently, flexure portion 62 of diaphragm member 56 is able to form a relatively smooth and full convolution during assembly that is substantially free of wrinkling and therefore not predisposed to cracking and failure, as is attributed to such wrinkling in present diaphragms.

In that diaphragm member 56 at clamping sections 58 and 60, and at bulbous ends 64,66 conforms in size and shape to the corresponding areas of a standard diaphragm 26, it is further adapted for assembly in standard air brake valve devices without requiring any modification to such valve devices, the assembly being characterized by the same positive high pressure seal and the same high degree of retention against pullout forces, as heretofore discussed relative to standard diaphragm member 26.

Moreover, keeping the thickness of the diaphragm in these clamping areas the same as the thickness of a standard diaphragm better accommodates manufacturing tolerances than would be the case if the diaphragm were the same thickness as thinner flexure portion 62.

Still further, it will be noted that the juncture of flexure portion 62 with tapered areas 68, 70 is such that tapered areas 68, 70 lie entirely within the annular area of inclined clamping surfaces 44, 50 in the assembled condition of diaphragm member 56, so that the previously discussed advantages of the standard air brake valve clamping configuration is realized, without the relatively thick clamping sections of the diaphragm member extending into the annular space in which the diaphragm convolution is formed. This maximizes the radius of curvature of the flexure portion of the diaphragm member in forming the convolution within the given space between piston member 18 and body 16, so that a smoother transition of the diaphragm convolution is realized as the pressure differential between chambers 32 and 34 reverses.

Figure 6:
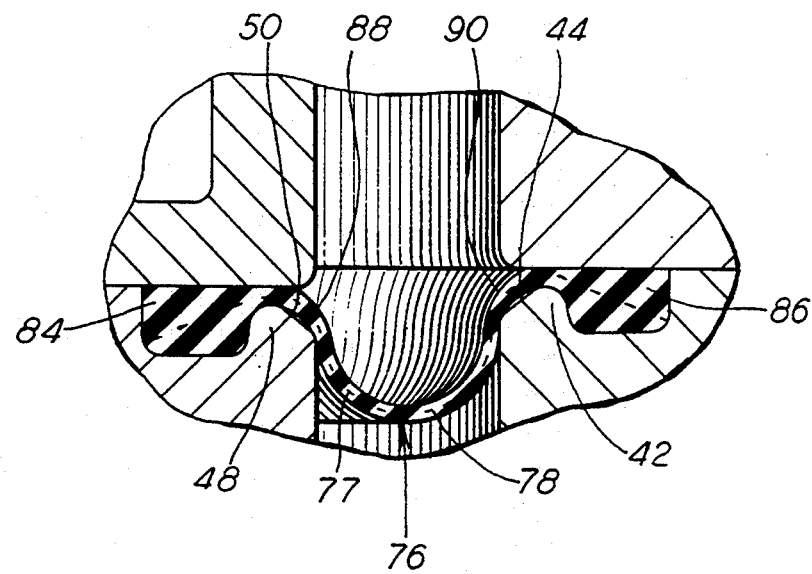
FIG. 6 is an enlarged partial section view of the diaphragm piston assembly similar to the assembly of FIG. 1 showing the improved diaphragm member of FIG. 5 assembled therewith.
Figure 5:
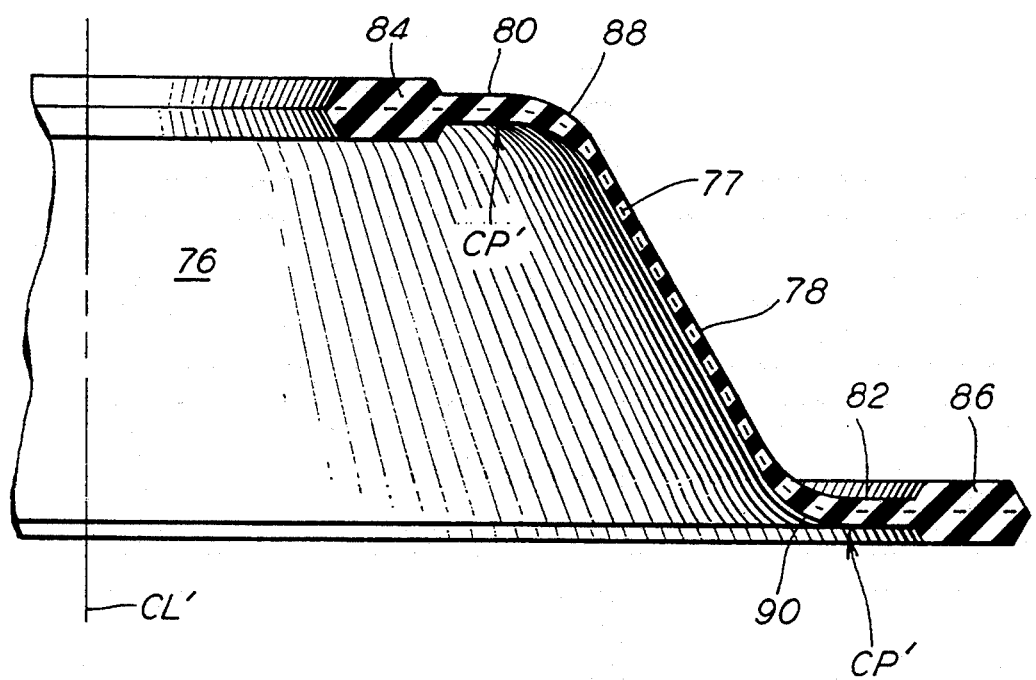
FIG. 5 is a partial section view in elevation showing a second embodiment of the improved diaphragm member of FIG. 3.

In FIG. 5 is shown a second embodiment of the invention disclosing an S-shaped, conical type diaphragm member 76 in accordance with the present invention. Diaphragm member 76 includes a central layer of reinforcing fabric 77 and is molded with a flexure portion 78 intermediate clamping sections 80, 82, the flexure portion being inclined relative to a central axis CL'. These clamping sections lie in spaced-apart horizontal planes, as viewed in the drawing, and terminate in bulbous ends 84, 86 forming the inner and outer periphery of diaphragm member 76. Flexure portion 78 is molded without a convolution to provide better "centering" of the reinforcing fabric during molding and extends linearly a distance sufficient to subsequently form a full convolution within the annular space between piston member 18 and body 16 in the assembled condition of diaphragm member 76, as shown in FIG. 6. The thickness of flexure portion 78 is less than the thickness of the respective clamping sections 80, 82. Preferably, the thickness of flexure portion 78 may be between 0.022 and 0.042 in., and the nominal thickness of bulbous ends 84, 86 is 0.10 in., while the thickness of clamping sections 80, 82 may be between 0.052 and 0.072 in.

The respective clamping sections 80, 82 are joined to flexure portion 78 by arcuately-shaped segments 88, 90. Arcuate segments 88, 90 are tapered, each being formed by a predetermined radius having different center points about which the upper and under sides of the arcuate segments are formed between the respective clamping sections and flexure portion.

This diaphragm member 76 is adapted for assembly in standard air brake valve devices without any modification thereto, by virtue of the size and shape of the clamping sections 80, 82 and bulbous ends 84, 86 conforming with the clamping section and bulbous ends of standard diaphragm member 26. In this respect, each clamping section 80, 82 extends inwardly from the respective bulbous ends thereof beyond a clamping point CP' at which the apex of clamping beads 42, 48 engages the diaphragm member in its assembled condition. Moreover, the convolution formed in the assembled state of diaphragm member 76 is generally without wrinkles, which are believed to impact diaphragm life, the absence of such wrinkles being attributed to the thin flexure portion 78, as explained relative to diaphragm member 56.

Also, as noted with respect to diaphragm member 56, the tapered arcuate segments 80, 82 of diaphragm member 76 lie entirely within the annular area of inclined clamping surfaces 44, 50, when diaphragm member 76 is in its assembled condition, as shown in FIG. 6, thereby maximizing the radius of curvature of flexure portion 78 in forming convolution 78, so as to optimize the low stress operation of diaphragm member 76 made possible by the reduced thickness of convolution 78.

Figure 7:
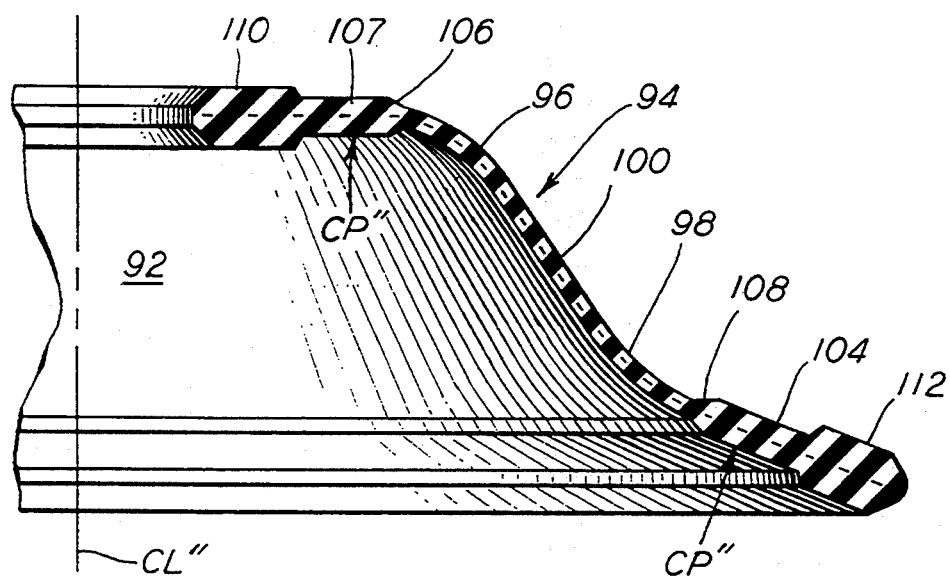
FIG. 7 is a partial section view in elevation showing a third embodiment of the improved diaphragm member of FIG. 3 suitable for mounting in the diaphragm piston assembly of FIG. 1 without modification thereto.

In FIG. 7 is shown an S-shaped, conical type diaphragm member 92 that differs from diaphragm member 76 in that the as-molded shape of flexure portion 94 is curvilinear, as opposed to being rectilinear, but is still absent a full convolution. Flexure portion 94 is molded with arcuate segments 96 and 98 having reverse angles of curvature, the adjacent ends of such arcuate segments being either connected to each other or interconnected by a rectilinear portion 100 as shown. This rectilinear portion 100 is inclined relative to a central axis CL". As in the case of the above-discussed novel diaphragm members 56 and 76, the thickness of flexure portion 94 of diaphragm member 92 is less than that of clamping sections 102 and 104 with which flexure portion 94 is connected via tapered sections 106 and 108. The inner diaphragm periphery is delineated by an annular bulbous end 110 associated with clamping section 102 and the outer diaphragm periphery is delineated by an annular bulbous end 112 associated with clamping section 104. The respective clamping sections and bulbous ends are sized and shaped for assembly in standard air brake valve devices, such that tapered sections 106, 108 lie entirely within the annular area of inclined clamping surfaces 44, 50, and clamping beads 42, 48 engage the diaphragm member at clamping points CP" of the respective clamping sections. Moreover, the thin flexure portion 94 facilitates formation of a full diaphragm convolution during assembly without wrinkling.

In that diaphragm member 92 exhibits low stress operation by reason of its curvilinear flexure portion 94, in accordance with the teachings of U.S. Pat. No. 4,951,554 this diaphragm member 92 is believed to be ideally suited to withstand the high pressures to which the relatively thin flexure portion 94 is subjected when assembled and operated in conventional air brake valve devices.

We claim:

1. An annular elastomeric diaphragm member molded in an S-shaped cross-sectional configuration with a layer of reinforcing material embedded therein comprising:
   (a) an inner annular periphery forming a central opening of said diaphragm member;
   (b) a first annular bulbous portion extending radially outwardly from said inner annular periphery and having a first predetermined thickness;
   (c) a first annular clamping section extending radially outwardly from said first annular bulbous portion, said first annular clamping section including a first annular tapered area and having a second predetermined thickness less than said first predetermined thickness;
   (d) an annular flexure portion extending radially outwardly from said first annular tapered area, said annular flexure portion having a third predetermined thickness and said third predetermined thickness being less than said second predetermined thickness;
   (e) a second annular clamping section having a second annular tapered area extending radially outwardly from said annular flexure portion, said second annular clamping section having a fourth predetermined thickness and said fourth predetermined thickness being greater than said third predetermined thickness and said fourth predetermined thickness being less than said first predetermined thickness; and (f) a second annular bulbous portion extending radially outwardly from said second clamping section and said second annular bulbous portion having a fifth predetermined thickness greater than said fourth predetermined thickness.

2. A diaphragm member as recited in claim 1, wherein said first and fifth predetermined thicknesses are generally equal.

3. A diaphragm member as recited in claim 1, wherein said second and fourth predetermined thicknesses are generally equal.

4. A diaphragm member as recited in claim 3, wherein said second predetermined thickness is between 0.052 and 0.072 in.

5. A diaphragm member as recited in claim 4, wherein said third predetermined thickness is a maximum of 0.042 in.

6. A diaphragm member as recited in claim 5, wherein the thickness of said flexure portion is generally constant throughout.

7. A diaphragm member as recited in claim 5, wherein said first and fifth predetermined thicknesses are nominally 0.10 in.

8. A diaphragm member as recited in claim 1, wherein said diaphragm member is characterized by said first and second tapered areas being annular arcuate segments.

9. A diaphragm member as recited in claim 8, further characterized in that at least one of said arcuate segments is formed by first and second radii, said first radius having a different center than said second radius.

10. A diaphragm member as recited in claim 9, further characterized in that said first and second clamping sections lie in generally parallel, spaced-apart planes, that are generally normal to said central axis.

11. A diaphragm member as recited in claim 1, further characterized in that said flexure portion is inclined relative to the central axis of said diaphragm member.

12. A diaphragm member as recited in claim 1, wherein said flexure portion comprises first and second annular arcuate segments.

13. A diaphragm member as recited in claim 12, further characterized in that a line of tangency between said first and second arcuate segments is inclined relative to the central axis of said diaphragm member.

14. A diaphragm member as recited in claim 1, wherein a portion of said first clamping section lies in a plane substantially normal to the central axis of said diaphragm member and a portion of said second clamping section is disposed at an angle relative to said first clamping section.

15. For use in combination with railway type air brake valve devices having a body portion and a piston member between which an annular working space is formed, the outer boundary of said working space being delineated by a wall of said body portion, an annular elastomeric diaphragm member molded in a generally conical shape and held at the inner periphery thereof between first and second clamping plates of said piston member and at the outer periphery thereof between said body portion and a cover portion, one of said first and second clamping plates having a first annular clamping groove and said body having a second annular clamping groove, one side of each said first and second clamping groove adjacent said annular working space terminating in a first and second clamping bead, respectively, said diaphragm member comprising:

(a) first and second annular clamping sections having a thickness of between 0.052 and 0.072 in., said first and second clamping sections terminating in a first and second bulbous portion at said inner diaphragm periphery and at said outer diaphragm periphery, respectively, said first annular clamping section extending from said first bulbous portion beyond a first clamping point at which said first clamping bead engages said diaphragm member and said second annular clamping section extending from said second bulbous portion beyond a second clamping point at which said second clamping bead engages said diaphragm member when said first and second bulbous portions are aligned in said first and second clamping grooves; and (b) an annular flexure portion joined with a first annular tapered area of said first clamping section at a first juncture therebetween the maximum diameter of said first tapered area being less than the outside diameter of said first clamping plate and joined with a second annular tapered area of said second clamping section at a second juncture therebetween, the minimum diameter of said second tapered area being greater than the diameter of said wall of said body portion, whereby said flexure portion forms an annular convolution that occupies the entire area of said annular working space when said diaphragm member is assembled between said body portion and said piston member, the maximum thickness of said annular flexure portion being 0.042 in.

16. A diaphragm member as recited in claim 15, wherein the thickness of said flexure portion is generally between 0.022 and 0.042 in.

17. A diaphragm member as recited in claim 15, wherein the thickness of said first and second bulbous portions is nominally 0.10 in.

18. A diaphragm member as recited in claim 15, wherein the thickness of said flexure portion is generally constant throughout.

19. A diaphragm member as recited in claim 15, wherein said diaphragm member further comprises a layer of fabric substantially centered throughout said diaphragm member between the top and bottom surfaces thereof.

20. A diaphragm member as recited in claim 15, wherein the taper of said first and second tapered areas is uniform between the top and bottom surfaces of said diaphragm member.

21. A diaphragm member as recited in claim 20, wherein said first and second clamping sections including said first and second tapered areas are linear with said flexure portion.

22. A diaphragm member as recited in claim 15, wherein said diaphragm member is molded in an S-shaped cross-sectional configuration.

23. A diaphragm member as recited in claim 22, wherein said diaphragm member is characterized by said first and second tapered areas being annular arcuate segments having reverse angles of curvature.

24. A diaphragm member as recited in claim 23, further characterized in that said arcuate segments comprising said first and second tapered areas are each formed by first and second radii, said first radius having a different center than said second radius.

25. A diaphragm member as recited in claim 24, further characterized in that said flexure portion is inclined relative to the central axis of said diaphragm member.

26. A diaphragm member as recited in claim 25, further characterized in that said first and second clamping sections lie in parallel, spaced-apart planes, that are normal to said central axis.

27. A diaphragm member as recited in claim 22, wherein the taper of said first and second tapered areas is uniform between the top and bottom surfaces of said diaphragm member.

28. A diaphragm member as recited in claim 27, wherein said flexure portion comprises first and second annular arcuate segments having reverse angles of curvature.

29. A diaphragm member as recited in claim 28, further characterized in that a line of tangency between said first and second arcuate segments is inclined.

30. A diaphragm member as recited in claim 29, wherein said first clamping section including said first tapered area lies in a plane substantially normal to the central axis of said diaphragm member and said second clamping section including said second tapered area is disposed at an angle relative to said first clamping section.

* * * * *